US 11,483,862 B2

United States Patent
Sun et al.

(10) Patent No.: US 11,483,862 B2
(45) Date of Patent: Oct. 25, 2022

(54) CONFIGURED GRANT RESOURCE VALIDATION

(71) Applicant: QUALCOMM Incorporated, San Diego, CA (US)

(72) Inventors: Jing Sun, San Diego, CA (US); Xiaoxia Zhang, San Diego, CA (US); Yan Zhou, San Diego, CA (US); Seyed Ali Akbar Fakoorian, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 16/910,699

(22) Filed: Jun. 24, 2020

(65) Prior Publication Data

US 2021/0007135 A1    Jan. 7, 2021

Related U.S. Application Data

(60) Provisional application No. 62/869,911, filed on Jul. 2, 2019.

(51) Int. Cl.
*H04W 4/00*    (2018.01)
*H04W 74/08*   (2009.01)
*H04W 72/14*   (2009.01)

(52) U.S. Cl.
CPC ........... *H04W 74/08* (2013.01); *H04W 72/14* (2013.01)

(58) Field of Classification Search
CPC . H04W 74/08; H04W 72/14; H04W 72/1268; H04W 72/1289
USPC ................................................. 370/329, 330
See application file for complete search history.

(56) References Cited

U.S. PATENT DOCUMENTS

| | | | | |
|---|---|---|---|---|
| 2017/0327725 | A1* | 11/2017 | Dobson, Jr. | C09K 8/64 |
| 2018/0035459 | A1* | 2/2018 | Islam | H04W 74/04 |
| 2019/0053319 | A1* | 2/2019 | Jeon | H04L 5/0098 |
| 2019/0104539 | A1* | 4/2019 | Park | H04W 72/1289 |
| 2019/0166620 | A1* | 5/2019 | Yasukawa | H04W 74/08 |
| 2020/0037345 | A1* | 1/2020 | Ryoo | H04W 72/1284 |
| 2020/0053730 | A1* | 2/2020 | Hosseini | H04L 5/0094 |
| 2020/0068612 | A1* | 2/2020 | Dai | H04W 72/14 |
| 2020/0178228 | A1* | 6/2020 | Li | H04L 5/00 |
| 2020/0213955 | A1* | 7/2020 | Hosseini | H04L 5/001 |

(Continued)

FOREIGN PATENT DOCUMENTS

| | | |
|---|---|---|
| EP | 3541133 A1 | 9/2019 |
| EP | 3614777 A1 | 2/2020 |

(Continued)

OTHER PUBLICATIONS

International Search Report and Written Opinion—PCT/US2020/039488—ISA/EPO—dated Sep. 8, 2020.

*Primary Examiner* — Chuong T Ho
(74) *Attorney, Agent, or Firm* — Qualcomm Incorporated

(57) ABSTRACT

Certain aspects of the present disclosure relate to communicating via grant-free uplink resources. An example method generally includes receiving, from a base station, a configuration indicating one or more sets of resources for grant-free uplink transmissions; determining a valid time to transmit a grant-free uplink transmission via the one or more sets of resources based on a transmission associated with the one or more sets of resources; and transmitting, to the base station, the grant-free uplink transmission based on the determination.

26 Claims, 8 Drawing Sheets

(56) References Cited

U.S. PATENT DOCUMENTS

| | | | | |
|---|---|---|---|---|
| 2020/0252190 A1* | 8/2020 | Hwang | ............... | H04L 25/0226 |
| 2021/0135730 A1* | 5/2021 | Chai | ..................... | H04B 7/063 |
| 2021/0168746 A1* | 6/2021 | Mi | .................... | H04W 56/0045 |

FOREIGN PATENT DOCUMENTS

| | | | |
|---|---|---|---|
| EP | 3621401 | A1 | 3/2020 |
| WO | 2018103702 | A1 | 6/2018 |
| WO | 2018202064 | A1 | 11/2018 |
| WO | 2018203441 | A1 | 11/2018 |

* cited by examiner

CONFIGURED GRANT RESOURCE VALIDATION

CROSS-REFERENCE TO RELATED APPLICATION

The present Application for Patent claims priority to U.S. Provisional Application No. 62/869,911, filed Jul. 2, 2019, which is assigned to the assignee of the present application and hereby expressly incorporated by reference herein in its entirety.

BACKGROUND

Field of the Disclosure

Aspects of the present disclosure relate to wireless communications, and more particularly, to techniques for communicating via grant-free uplink resources.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved grant-free uplink communications.

Certain aspects provide a method of wireless communication by a user equipment (UE). The method generally includes receiving, from a base station, a configuration indicating one or more sets of resources for grant-free uplink transmissions; determining a valid time to transmit a grant-free uplink transmission via the one or more sets of resources based on a transmission associated with the one or more sets of resources; and transmitting, to the base station, the grant-free uplink transmission based on the determination.

Certain aspects provide a method of wireless communication by network entity such as a base station. The method generally includes generating a configuration indicating one or more sets of resources for grant-free uplink transmissions; transmitting the configuration to a user equipment (UE); determining a valid time to receive a grant-free uplink transmission from the UE based on a transmission associated with the one or more sets of resources; and receiving grant-free uplink transmissions from the UE in accordance with the determination.

Certain aspects provide an apparatus for wireless communication. The apparatus generally includes a receiver configured to receive, from a base station, a configuration indicating one or more sets of resources for grant-free uplink transmissions. The apparatus also includes a processor configured to determine a valid time to transmit a grant-free uplink transmission via the one or more sets of resources based on a transmission associated with the one or more sets of resources and a memory coupled to the processor. The apparatus further includes a transmitter configured to transmit, to the base station, the grant-free uplink transmission based on the determination.

Certain aspects provide an apparatus for wireless communication. The apparatus generally includes a processor configured to: generate a configuration indicating one or more sets of resources for grant-free uplink transmissions, and determine a valid time to receive a grant-free uplink transmission from a user equipment (UE) based on a transmission associated with the one or more sets of resources. The apparatus also includes a memory coupled to the processor and a transmitter configured to transmit the configuration to the UE. The apparatus further includes a receiver configured to receive grant-free uplink transmissions from the UE in accordance with the determination.

Certain aspects provide an apparatus for wireless communication. The apparatus generally includes means for receiving, from a base station, a configuration indicating one or more sets of resources for grant-free uplink transmissions. The apparatus also includes means for determining a valid time to transmit a grant-free uplink transmission via the one or more sets of resources based on a transmission associated with the one or more sets of resources. The apparatus further includes means for transmitting, to the base station, the grant-free uplink transmission based on the determination.

Certain aspects provide an apparatus for wireless communication. The apparatus generally includes means for generating a configuration indicating one or more sets of resources for grant-free uplink transmissions; means for transmitting the configuration to a user equipment (UE); means for determining a valid time to receive a grant-free uplink transmission from the UE based on a transmission associated with the one or more sets of resources; and means for receiving grant-free uplink transmissions from the UE in accordance with the determination.

Certain aspects provide a computer-readable medium having instructions stored thereon for receiving, from a base station, a configuration indicating one or more sets of resources for grant-free uplink transmissions; determining a valid time to transmit a grant-free uplink transmission via the one or more sets of resources based on a transmission associated with the one or more sets of resources; and transmitting, to the base station, the grant-free uplink transmission based on the determination.

Certain aspects provide a computer-readable medium having instructions stored thereon for a computer-readable medium having instructions stored thereon for: generating a configuration indicating one or more sets of resources for grant-free uplink transmissions; transmitting the configuration to a user equipment (UE); determining a valid time to receive a grant-free uplink transmission from the UE based on a transmission associated with the one or more sets of resources; and receiving grant-free uplink transmissions from the UE in accordance with the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
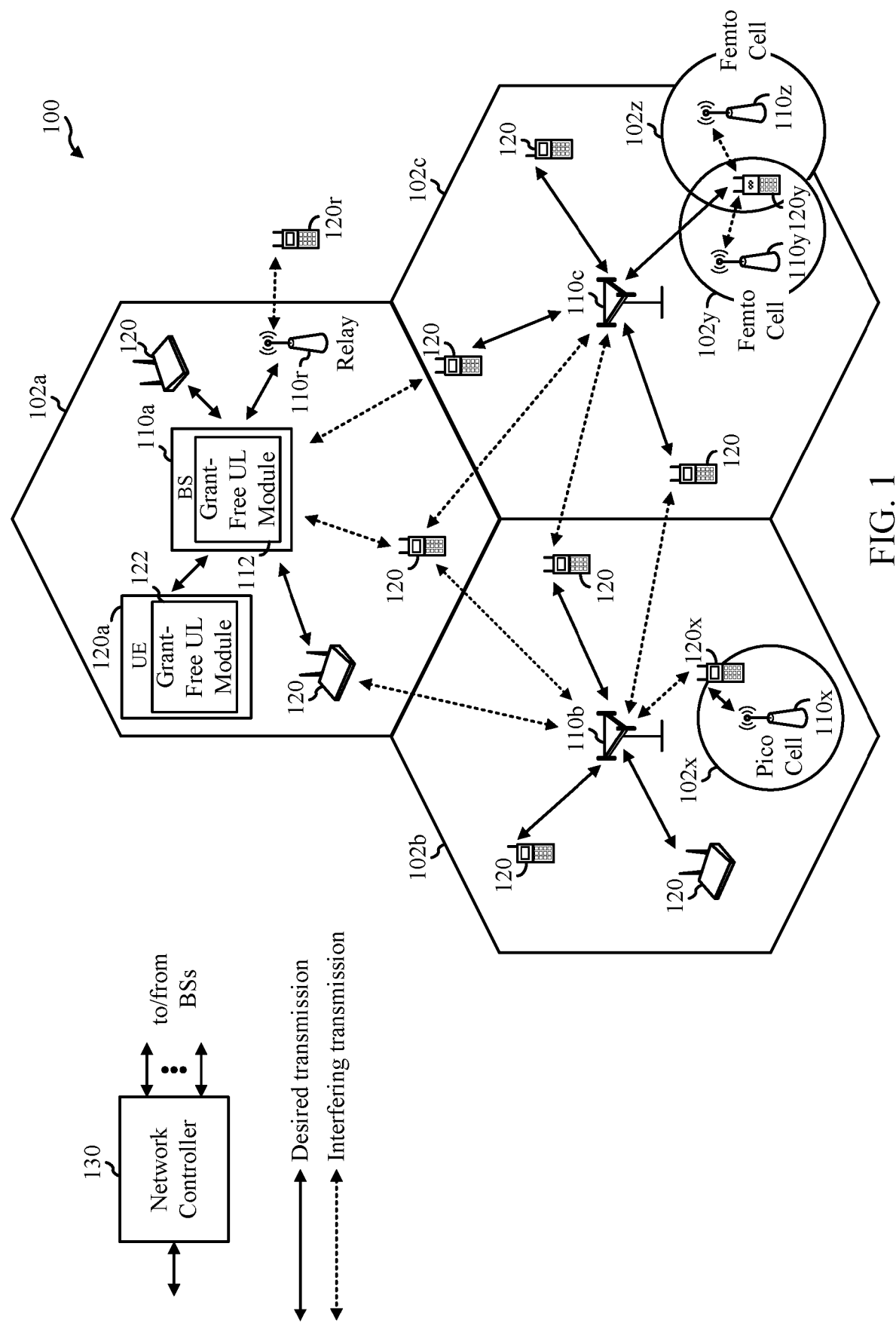
FIG. 1 is a block diagram conceptually illustrating an example telecommunications system, in accordance with certain aspects of the present disclosure.

Aspects of the present disclosure provide apparatus, methods, processing systems, and computer-readable mediums for determining valid occurrences of configured grant uplink resources. For example, a prohibit timer may be enabled at certain times, and during the prohibit timer, the UE may temporarily disable communications via one or more configured grant resources, as further described herein. As another example, configured grant resources may be associated with downlink resources that enable or disable certain configured grant resources as further described herein. In another example, configured grant resources may be associated with resources, corresponding to an uplink transmission, that enable or disable certain configured grant resources as further described herein. As such, aspects of the present disclosure described herein may enable a base station to allocate processing resources for other applications during invalid occurrences of a configured grant resource. Certain aspects of the present disclosure described herein may also enable a radio access network (RAN) to distribute the configured grant resources across the UEs without overloading a particular resource, and thus avoiding unsuccessful blind decodes at the base station during a configured grant resource occurrence.

The following description provides examples of traffic burst awareness in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. The wireless communication network 100 may be an NR system (e.g., a 5G NR network). As shown in FIG. 1, the BS 110a may include a grant-free uplink module 112, which may determine valid times to receive grant-free uplink transmissions, in accordance with aspects of the present disclosure. In aspects, the UE 120a may include a grant-free uplink module 122, which may determine valid times to transmit grant-free uplink transmissions, in accordance with aspects of the present disclosure.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
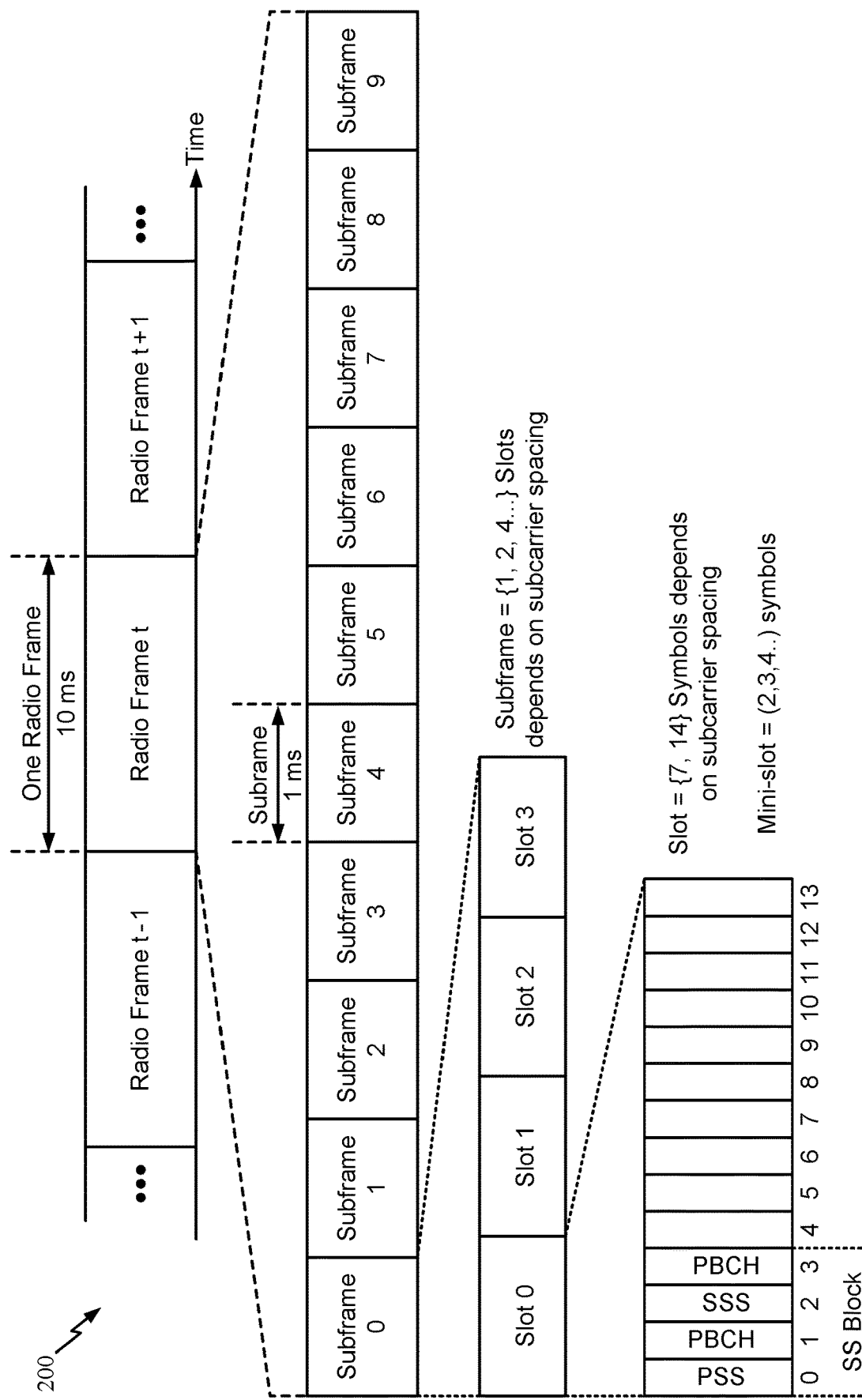
FIG. 2 illustrates an example of a frame format for a telecommunication system, in accordance with certain aspects of the present disclosure.

FIG. 2 is a diagram showing an example of a frame format 200 for certain wireless communications, such as 5G NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 2. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example Configured Grant Resource Validation

In certain wireless communication systems (e.g., a 5G NR wireless communication network), the RAN may configure multiple UEs to share periodic uplink resources, called a configured grant, which may reduce latency and resource overhead associated with scheduling dynamically allocated resources. The grant-free periodic resources may reduce latency by eliminating the packet transmission delay for a scheduling request procedure. The grant-free periodic resources may also increase the utilization ratio of radio resources by reducing the overhead associated with scheduling dynamic grants. As an example, upon establishing a connection to the network, for example, via a radio resource control (RRC) connection establishment procedure, a UE may be configured to transmit via shared periodic resources for relatively small uplink payloads. In another example, the configured grant may be provided by control signaling such as a medium access control (MAC) control element (MAC-CE) or downlink control information (DCI).

The configured grant resources may be used in industrial IOT or MTC applications where the uplink payloads may be static in size, relatively small, and periodic. For example, the IOT or MTC devices may periodically provide measurements or status updates (e.g., a vehicle providing status updates) to a server in communication with the RAN.

As another example, the RAN may provide multiple configured grant resources to allow for uplink transmission flexibility where the UE may only have a small amount of uplink traffic at various times. For example, the UE may be configured with multiple sets of shared periodic resources associated with grant-free uplink transmissions, and each configured grant resource set may have a different periodic offset to allow the UE to select the closest configured grant resource for uplink traffic.

For each of the configured grant resource sets, the base station may be committed to monitor and blind decode the uplink resources, such as a PUSCH, at each periodic occurrence of the configured grants. As a result, the base station may use substantial processing resources to monitor each of the configured grant resource sets. In some cases, the UE may only transmit on the configured grant resources when there is uplink traffic. Thus, the base station may be monitoring configured grant resources with no uplink traffic, and the base station may be committing processing resources, to the configured grant communications, that could be used for other applications. In addition, the RAN may overload a configured grant resource with multiple UEs to provide trunking gain, but at the cost of potential collisions. That is, with multiple UEs sharing the configured grant resource, the configured grant resource may become overloaded with uplink traffic such that the base station is unable to blind decode all or some of transmissions.

Certain aspects of the present disclosure generally relate to determining valid times to communicate via grant-free uplink resources. The present disclosure proposes a validation scheme under which some of the configured grant resources may be used during certain times and other configured grant resources may not be used during certain times. That is, although multiple configured grant resources may be configured, a subset of configured grant resources may be used by the RAN at any given occurrence.

As an example, a prohibit timer may be enabled after the UE transmits via a configured grant resource, and during the prohibit timer, the UE may not be allowed to communicate via one or more configured grant resources, as further described herein with respect to FIGS. 3, 4, 7, and 8. As another example, a set of configured grant resources may be associated with a set of downlink transmission resources that enable or disable certain configured grant resources as further described herein with respect to FIGS. 3, 5, 7, and 8. In another example, a set of configured grant resources may be associated with resources, corresponding to an uplink transmission, that enable or disable certain configured grant resources as further described herein with respect to FIGS. 3, 6, 7, and 8.

Certain aspects of the present disclosure described herein may enable a base station to allocate processing resources for other applications during invalid occurrences of a configured grant resource. Certain aspects of the present disclosure described herein may enable the RAN to distribute the configured grant resources across the UEs without overloading a particular resource, and thus avoiding unsuccessful blind decodes at the base station during a configured grant resource occurrence.

Figure 3:
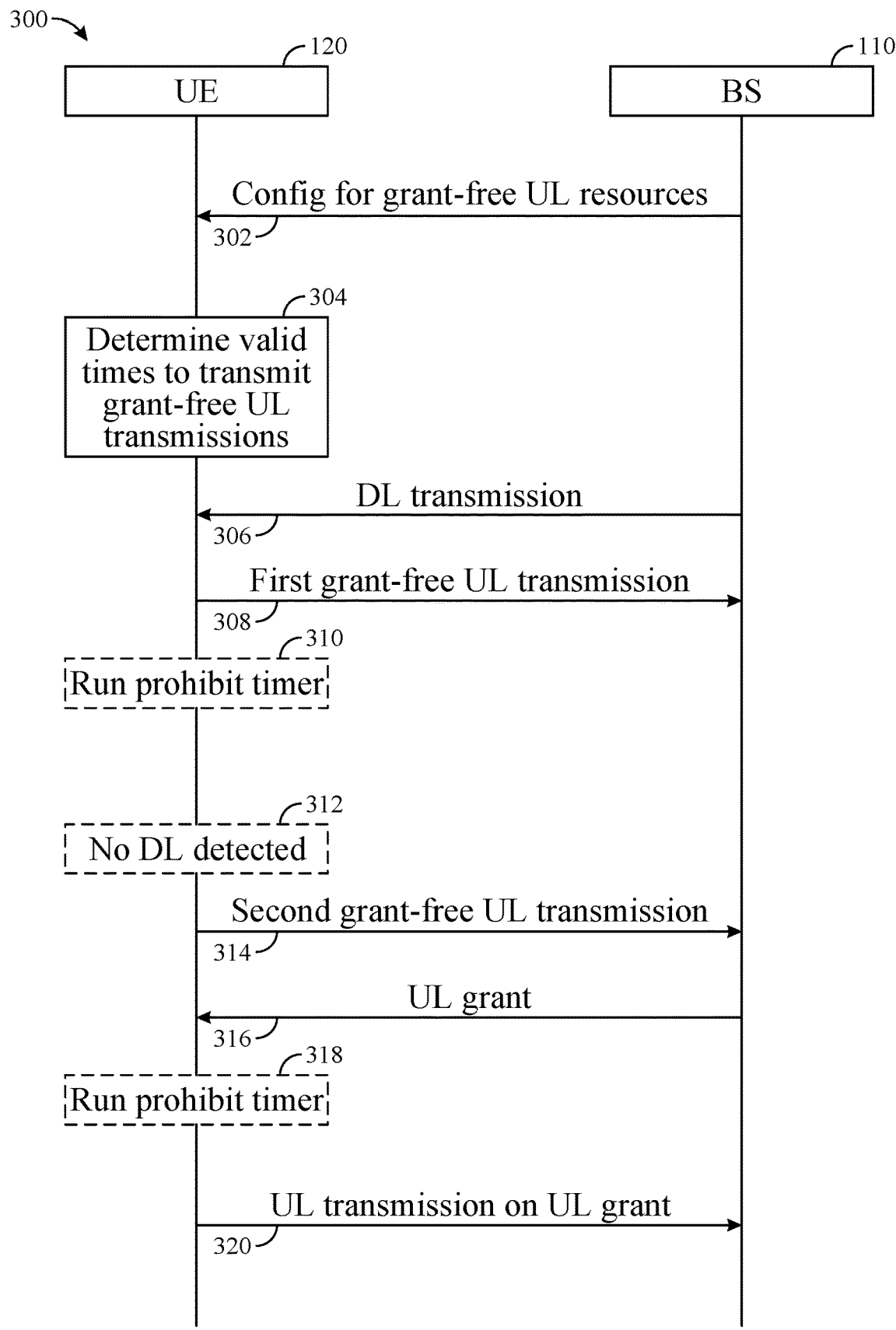
FIG. 3 is a call flow diagram illustrating example operations for determining valid times to communicate via grant-free uplink resources, in accordance with aspects of the present disclosure.

FIG. 3 is a call-flow diagram illustrating example operations 300 for determining valid times to communicate via grant-free uplink resources, in accordance with certain aspects of the present disclosure. At 302, the BS 110 may transmit, to the UE 120, a configuration indicating one or more sets of resources for grant-free uplink transmissions, which may be called configured grant resource sets. The BS 110 may transmit the configuration via control signaling including an RRC element, MAC-CE, or DCI message. In aspects, all or a portion of the configuration may be enabled by another transmission carrying control signaling, such as DCI or a MAC-CE. For instance, the configuration may have multiple sets of configured grant resources, but the BS may only enable a subset of the configured grant resources.

A set of configured grant resources may have a configuration that provides various parameters associated with the grant-free uplink resources including a periodicity, a modulation and coding scheme (MCS), a frequency resource allocation, a time-domain resource allocation, a time-domain offset, the number of HARQ processes for configured grant, a transform precoder, etc. That is, the configuration at 302 may include multiple configurations, where each of the configurations may correspond to a configured resource set.

At 304, the UE 120 may determine, based on the configuration, valid times to transmit grant-free uplink (UL) transmissions via the configured grant resources. For example, the configuration may indicate that a first set of the sets of resources is associated with a second set of resources for downlink transmissions such that the valid times to transmit the grant-free uplink transmissions on the first set of resources is dependent on the UE detecting a downlink transmission on the second set of resources before communicating via the first set of resources. At 306, the UE 120 may receive a downlink transmission on the second set of resources, which may enable the first set of resources for grant-free uplink transmissions. At 308, the UE may determine that an occurrence of the first set of resources is available for communication, based on the detected downlink transmission, and transmit a first grant-free uplink transmission on the first set of resources.

As another example, the configuration may indicate that the first set of resources is associated with a prohibit timer that runs from a grant-free uplink transmission on the first set of resources. Thus, at 310, the UE 120 may run the prohibit timer after the transmission at 308 and temporarily refrain from transmitting grant-free uplink transmissions on the first set of resources during the prohibit timer.

Suppose the configuration indicates that a third set of the sets of resources is available for grant-free uplink transmissions if no downlink transmission is transmitted on the second set of resources. That is, the valid times to transmit grant-free uplink transmissions on the third set of resources may be dependent on there being no downlink transmissions detected on the second set of resources. For example, at 312, the UE 120 may detect that no downlink transmission has been transmitted on the second set of resources, and at 314, the UE 120 may determine that an occurrence of the third set of resources is available for communication, based on the absence of a downlink transmission, and transmit the second grant-free uplink transmission on the third set of resources.

In another example, the configuration may indicate that a fourth set of the sets of resources is associated with a fifth set of resources corresponding to an uplink transmission that temporarily disables grant-free uplink transmissions on the fourth set of resources. For example, the UE 120 may monitor the fifth set of resources for an uplink grant. Upon receiving the uplink grant on the first set of resources at 316, the UE 120 may determine that the fourth set of resources is temporarily unavailable and transmit, at 320, any packets generated for a grant-free transmission according to the uplink grant, while temporarily refraining from using the fourth set of resources. In other cases, the reception of the UL grant at 316 may trigger a prohibit timer associated with the fourth set of resources at 318. The UE 120 may refrain from transmitting grant-free uplink transmissions on the fourth set of resources during the prohibit timer.

Figure 4:
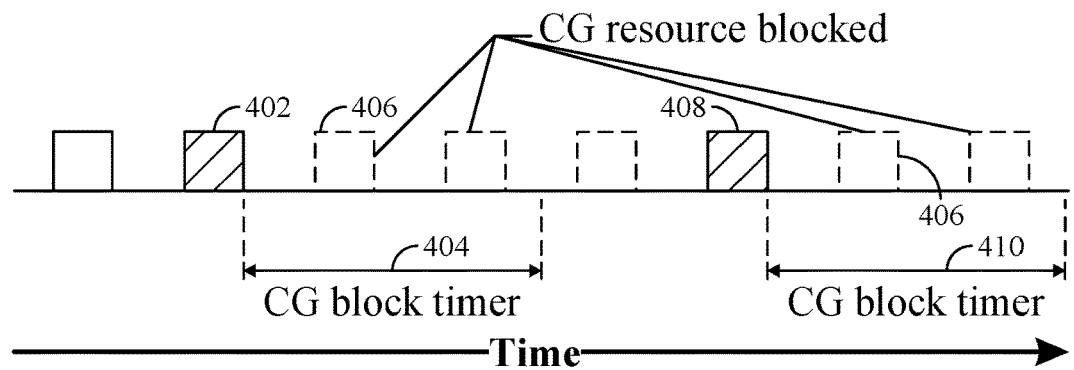
FIG. 4 illustrates an example traffic flow with a prohibit timer, in accordance with aspects of the present disclosure.

FIG. 4 illustrates an example traffic flow with a prohibit timer, in accordance with certain aspects of the present disclosure. As shown, a UE may transmit a grant-free uplink transmission 402 on a first set of configured grant resources, which may be associated with a first prohibit timer 404 that runs from a grant-free uplink transmission. The UE may refrain from using the first set of resources during the prohibit timer. For example, the configured grant configuration associated with the first set of resources may have a periodicity where an occurrence 406 of the first set of resources falls within the prohibit timer 404. In certain aspects, multiple occurrences of the first set of resources may fall within the prohibit timer 404. The prohibit timer may only apply to refraining from transmitting a subsequent grant-free uplink transmission on the first set of resources. In other aspects, the prohibit timer may apply to refraining from transmitting on multiple sets of resources for grant-free uplink transmissions. The prohibit timer 404 may run before or after the grant-free uplink transmission.

As another example, the UE may receive an uplink grant 408 on a second set of resources associated with the first set of resources. A second prohibit timer 410 may run from the uplink grant 408, and the UE may refrain from communicating on the first set of resources during the second prohibit timer 410. As shown, another occurrence 406 of the first set of resources may fall within the second prohibit timer 410. In certain aspects, the UE may transmit any packets generated for the grant-free uplink transmission on the scheduled resource indicated in the uplink grant 408 as further described herein with respect to FIG. 6.

The prohibit timer may be in the form of a time range or a configured grant resource counter (e.g., a number of periods or occurrences of configured grant resources). For instance, configuration (e.g., the configuration at 302) may indicate the prohibit timer as a number of periods (e.g., the periods 520 or 620) associated with a set configured grant resources. In other aspects, the configuration may indicate the prohibit timer as a time range, for example, in milliseconds or as a time-domain resource such as one or more symbols, mini-slots, slots, etc.

The prohibit timer may apply on a per configured grant resource basis or across all or some of the configured grant resources. For example, the prohibit timer may only apply to refraining from transmitting the subsequent grant-free uplink transmission on a set of resources that trigger the timer. In other aspects, the prohibit timer may apply to refraining from communicating grant-free uplink transmissions on all or some of the configured grant resources.

Figure 5:
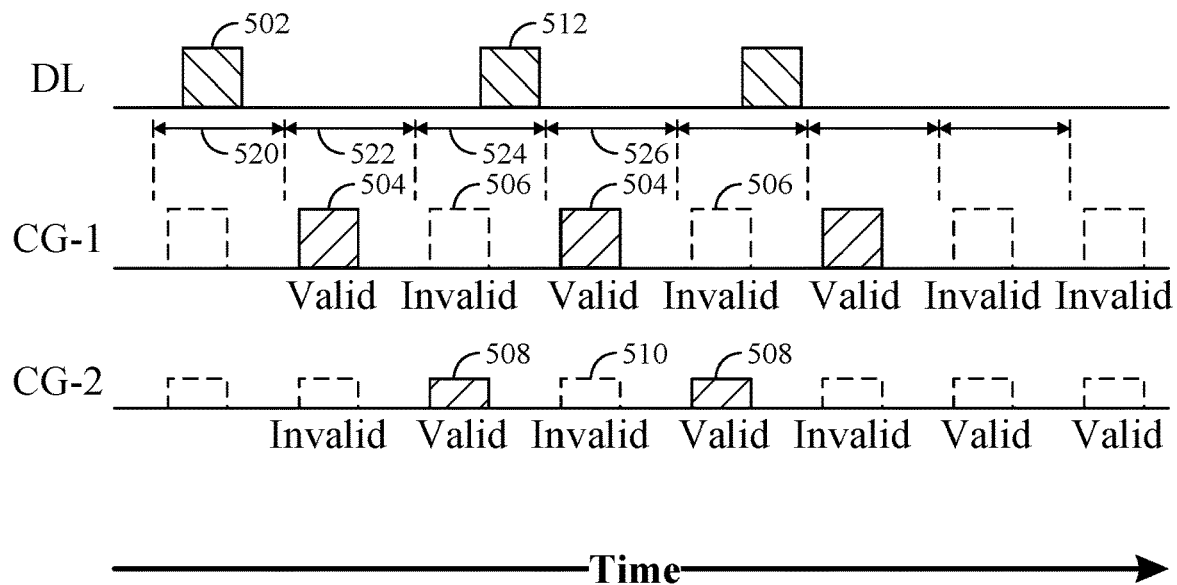
FIG. 5 illustrates an example traffic flow with valid times for grant-free transmissions determined based on a downlink transmission, in accordance with certain aspects of the present disclosure.

FIG. 5 illustrates an example traffic flow with valid times for grant-free transmissions determined based on a downlink transmission, in accordance with certain aspects of the present disclosure. As shown, one or more UEs may be configured with two sets of configured grant resources including a first set of resources CG-1 and a second set of resources CG-2. In this example, the two sets of configured grant resources may share the same periodicity with periods 520, 522, 524, and 526 at the same offset. That is, the sets of configured grant resources CG-1 and CG-2 may have the same period length, and the sets of configured grant resources CG-1 and CG-2 may be in phase with each other. However, it should be appreciated that the configured grant resources may have different period lengths and different offsets (i.e., out of phase). In certain aspects, a group of UEs may be configured with the first set of resources CG-1, and another group of UEs may be configured with the second set of resources CG-2. In other aspects, a UE may be configured with both sets of configured grant resources CG-1 and CG-2.

The first set of configured grant resources CG-1 may be associated with a set of downlink resources (DL), such that if a downlink transmission 502 is detected on the downlink resources, for example, within a period 520 of the first set of configured grant resources (CG-1), the presence of the downlink transmission 502 may enable the UE to communicate via the first set of configured grant resources (CG-1). The first set of configured grant resources CG-1 may be applied in cases where the configured grant resources carry a response for the downlink transmission.

Based on the presence of the downlink transmission 502, the UE may determine that the next occurrence 504 of the first set of configured grant resources (CG-1) is a valid time to transmit a grant-free uplink transmission. That is, the UE may determine that the next occurrence 504 of the first set of configured grant resources (CG-1) is available for transmission and transmit a grant-free uplink transmission within the next period 522 based on the detection of the downlink transmission 502. If the UE does not detect a downlink transmission on the downlink resources within a prior period (e.g., the period 522), the UE may refrain from transmitting a grant-free uplink transmission at the next occurrence 506 of the first set of configured grant resources (CG-1) within the period 524. That is, based on the absence of a downlink transmission on the downlink resources within a prior period, the UE may determine that the next occurrence of the first set of configured grant resources (CG-1) is an invalid time for grant-free uplink communications.

In aspects, the first set of configured grant resources CG-1 may be associated with downlink resources for a downlink SPS transmission. As an example, the set of configured grant resources may have the same size as the downlink resources, such as the same number of symbols, mini-slots, or slots. The set of configured grant resources may have the same periodicity as the downlink resources, but the set of configured grant resources may be offset relative to the downlink resources. For example, if the UE detects a downlink SPS transmission on the downlink resources, the UE may determine that the next occurrence of the set of configured grant resources is available for grant-free uplink transmissions.

The second set of configured grant resources CG-2 may also be associated with a set of downlink resources, such that if no downlink transmission is detected, for example, within a period (e.g., the period 522), the absence of the downlink transmission may enable the UE to communicate via the second set of configured grant resources (CG-2). For example, based on the absence of a downlink transmission on the downlink resources in a prior period (e.g., the period 522), the UE may determine that the next occurrence 508 of the second set of configured grant resources (CG-2) is available for transmission and transmit a grant-free uplink transmission within the next period 524. If the UE detects a downlink transmission (e.g., a second downlink transmission 512) within a prior period (e.g., the period 524), the UE may refrain from transmitting a grant-free uplink transmission at the next occurrence 510 of the second set of configured grant resources (CG-2) within the next period 526. That is, based on the presence of a downlink transmission on the downlink transmission within a prior period, the UE may determine that the next occurrence of the second set of configured grant resources (CG-2) is an invalid time for grant-free uplink communications.

In aspects, although the monitoring of time ranges is shown as corresponding to periods of configured grant resources, other time ranges may be used for performing the configured grant resource validation operations described herein. For example, the downlink transmissions may be monitored within any suitable time range before an occurrence of a configured grant resource. The time range may span a portion of a period of a configured grant resource, one or more periods of the configured grant resources, or a certain time duration, for example, in milliseconds or as a time-domain resource such as one or more symbols, mini-slots, slots, etc.

In certain aspects, if there is a unicast grant or downlink semi-persistent scheduling (SPS) transmission detected in the time range, the next one or more occurrences of the configured grant resource may be considered valid times to communicate via the configured grant resources. A configuration may indicate the time range as an offset relative to one of the configured grant resources. The time ranges associated with different configured grant resources may overlap with each other or may not overlap with each other.

Figure 6:
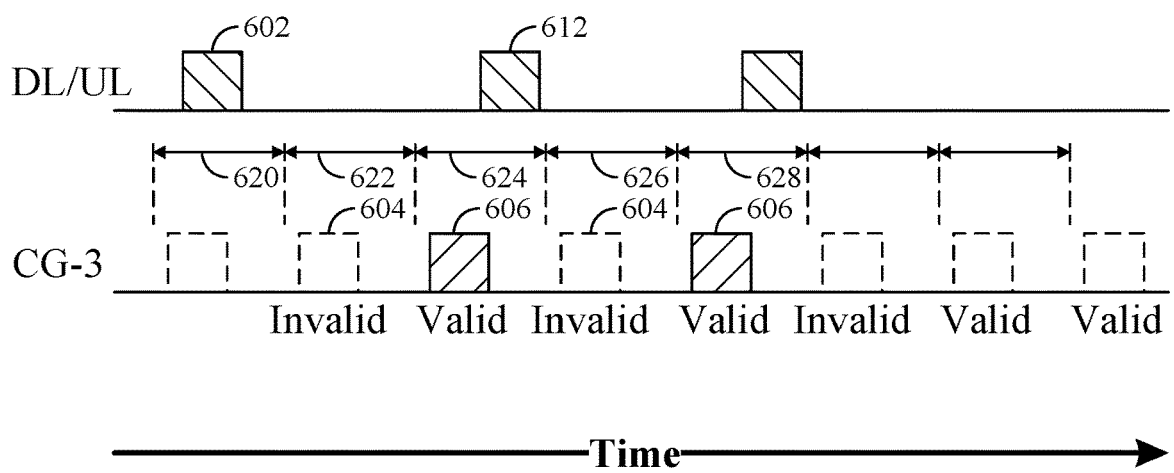
FIG. 6 illustrates an example traffic flow with valid times for grant-free transmissions determined based on an uplink transmission, in accordance with certain aspects of the present disclosure.

FIG. 6 illustrates an example traffic flow with valid times for grant-free transmissions determined based on an uplink transmission, in accordance with certain aspects of the present disclosure. As shown, one or more UEs may be configured with a set of configured grant resources CG-3 having a periodicity with periods 620, 622, 624, 626, and 628.

The set of configured grant resources may be associated with scheduled uplink resources, which may be downlink or uplink resources, corresponding to an uplink transmission. The uplink transmission may indicate when to temporarily pause grant-free uplink communications and piggy back packets generated for grant-free uplink transmissions on the scheduled uplink traffic. For example, the RAN may provide the UE with a more accurate MCS and resource allocation for the scheduled uplink traffic.

For example, the UE may receive an uplink grant scheduling the UE to transmit an uplink transmission 602 via the scheduled uplink resources (e.g., a set of slots scheduled for the UL PUSCH transmission). If the UE identifies that the uplink transmission 602 is scheduled on the resources within a prior period (e.g., the period 620) of the configured grant resources, the UE may temporarily consider the next occurrence 604 of the set of configured grant resources CG-3 as being an invalid time to communicate via the grant-free resources. That is, the UE may refrain from communicating via the set of configured grant resources CG-3 at the occurrence 604 based on detecting the uplink transmission 602 being scheduled with the scheduled uplink resources. If the UE determines that there is no uplink transmission scheduled on the scheduled uplink resources within a prior period (e.g., the period 622), the UE may determine that the next occurrence of the configured grant resources is a valid time (i.e., available for grant-free communication) and transmit a grant-free uplink transmission 606 within the next period (e.g., the period 624).

In other aspects, the scheduled uplink resources associated with the set of configured grant resources CG-3 may be downlink resources on which an uplink grant is received (e.g., a set of slots that the uplink grant is received). For example, the UE may receive an uplink grant 612, on the scheduled uplink resources, scheduling the UE to transmit an uplink transmission, and the presence of the uplink grant 612 may temporarily pause communication via the set of configured grant resources CG-3. The UE may determine that the occurrence 604 is invalid (i.e., unavailable for grant-free uplink communications) in period 626 based on detecting the uplink grant 612 on the downlink resources associated with the set of configured grant resources CG-3, and the UE may refrain from communicating via the set of configured grant resources CG-3 at the occurrence 604. If the UE determines that there is no uplink grant detected on the scheduled uplink resources within a prior period (e.g., the period 626), the UE may determine that the next occurrence of the configured grant resources is valid (i.e., available for grant-free communication) and transmit a grant-free uplink transmission 606 within the next period (e.g., the period 628).

In aspects, although the monitoring of time ranges is shown as corresponding to periods of configured grant resources, other time ranges may be used for performing the configured grant resource validation operations described herein. For example, the uplink grant or the scheduled uplink transmission may be monitored within any suitable time range before an occurrence of a configured grant resource. The time range may span a portion of a period of a configured grant resource, one or more periods of the configured grant resources, or a certain time duration, for example, in milliseconds or as a time-domain resource such as one or more symbols, mini-slots, slots, etc. If there is an uplink grant or the scheduled uplink transmission detected in the time range, the next one or more occurrences of the configured grant resource may be considered invalid time(s) to communicate via the configured grant resources.

In aspects, the transmissions (e.g., transmissions 502, 512, 602, or 612) associated with the configured grant resources may be transmitted on an aperiodic, periodic, or semi-persistent basis. The transmissions may include an uplink transmission, a downlink transmission, a data transmission, a control transmission, a unicast grant transmission, or a downlink semi-persistent scheduling (SPS) transmission.

Valid occurrences of the configured grant resources may refer to times when the configured grant resources are available for grant-free uplink transmissions. Invalid occurrences of the configured grant resources may refer to times when the configured grant resources are unavailable (or disabled) for grant-free uplink transmissions. During an invalid occurrence of a configured grant resource, the RAN may reallocate the invalid occurrence to other UEs to efficiently distribute resources. As another advantage, during the invalid occurrence, the BS may refrain from blind decoding the configured grant resource, enabling the BS to dedicate processing resources to other tasks.

Figure 7:
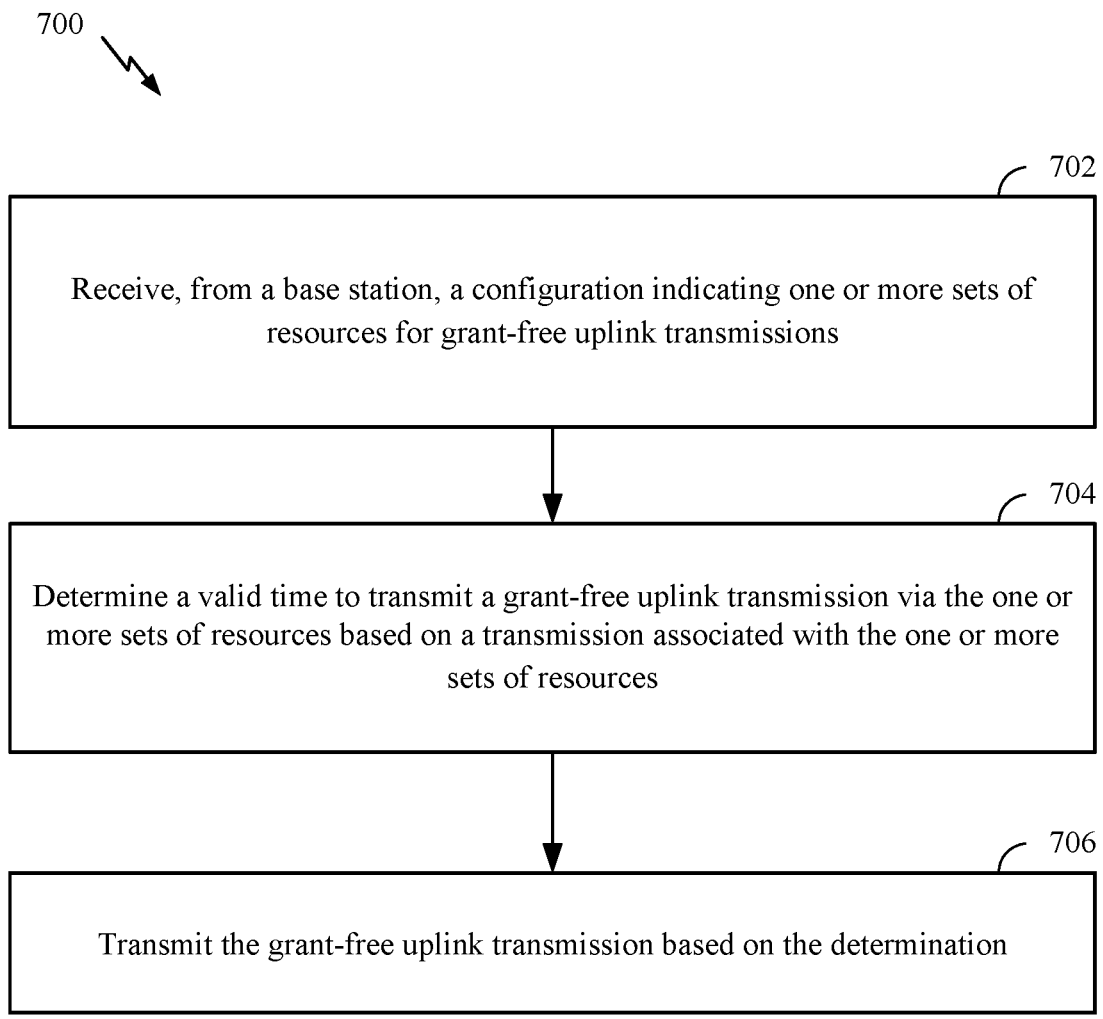
FIG. 7 is a flow diagram illustrating example operations for wireless communication by a user equipment (UE), in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., the UE 120a in the wireless communication network 100). The operations 700 may be implemented as software components that are executed and run on one or more processors (e.g., controller/processor 1080 of FIG. 10). Further, the transmission and reception of signals by the UE in operations 700 may be enabled, for example, by one or more antennas (e.g., antennas 1052 of FIG. 10). In certain aspects, the transmission and/or reception of signals by the UE may be implemented via a bus interface of one or more processors (e.g., controller/processor 1080) obtaining and/or outputting signals.

The operations 700 may begin, at 702, where the UE may receive, from a base station (e.g., BS 110), a configuration indicating one or more sets of resources for grant-free uplink transmissions (e.g., configured grant resources). At 704, the UE may determine a valid time to transmit a grant-free uplink transmission via the one or more sets of resources based on a transmission associated with the one or more sets of resources. At 706, the UE may transmit the grant-free uplink transmission based on the determination.

In accordance with certain aspects, the valid time to transmit the grant-free uplink transmission may be based on a timer, such as the prohibit timer as described herein with respect to FIG. 4. At 704, the UE may determine, based on the configuration, that the first set of the sets of resources is associated with a prohibit timer. At 706, the UE may transmit the grant-free uplink transmission on the first set of resources, which may trigger the prohibit timer, and the UE may then refrain from transmitting a subsequent grant-free uplink transmission via at least one of the one or more sets of resources during the prohibit timer in accordance with the determination of the valid time.

The prohibit timer may only apply to refraining from transmitting the subsequent grant-free uplink transmission on the first set of resources. In other aspects, the prohibit timer may apply to refraining from transmitting the subsequent grant-free uplink transmission on all or some of the one or more sets of configured grant resources. The prohibit timer may be a time period that runs from the grant-free uplink transmission on the first set of resources. The configuration may indicate the prohibit timer as a number of periods (e.g., the periods 520 or 620) associated with the at least one of the one or more sets of resources. In other aspects, the configuration may indicate the prohibit timer as a time range, for example, in milliseconds or as a time-domain resource such as one or more symbols, mini-slots, slots, etc.

In accordance with certain aspects, the valid time to transmit the grant-free uplink transmission may be determined based on whether a downlink transmission is detected on a set of downlink resources, for example, as described herein with respect to FIG. 5. In aspects, the downlink transmission may include a data transmission, a unicast grant transmission, or a downlink semi-persistent scheduling (SPS) transmission.

As an example, at 704, the UE may determine that a first set of the sets of resources is associated with a second set of resources for downlink transmissions, and at 706, the UE may transmit, to the base station, the grant-free uplink transmission via the one or more sets of resources based on whether the UE detects a downlink transmission on the second set of resources.

In certain aspects, transmitting via the first set of resources may be dependent on detecting the downlink transmission on the second set of resources, for example, within one or more prior periods of the first set of resources before communicating via the first set of resources. For instance, the UE may detect the downlink transmission (e.g., the downlink transmission 502) on the second set of resources within a prior period (e.g., period 520). The UE may determine that one or more next occurrences of the first set of resources are available for grant-free uplink transmissions after detecting the downlink transmission on the second set of resources. At 706, the UE may transmit the grant-free uplink transmission via the first set of resources after detecting the downlink transmission on the second set of resources.

In other aspects, the configured grant resources may be available for grant-free uplink transmissions if there is no downlink transmission detected on the second set of resources, for example, within one or more prior periods of the configured grant resources. For example, the UE may determine, based on the configuration, that a third set of the sets of resources is available for grant-free uplink transmissions if no downlink transmission is detected on the second set of resources. The UE may determine that no downlink transmission is detected on the second set of resources within a prior period (e.g., the period 522), and the UE may determine that one or more next occurrences of the third set of resources are available for grant-free uplink transmissions after detecting no downlink transmission on the second set of resources.

In certain aspects, the configured grant resources may be associated with a time range in which to monitor the downlink transmission. For example, the first set of resources may be associated with a time range before the first set of resources, and transmitting via the first set of resources may dependent on detecting the downlink transmission on the second set of resources within the time range. The UE may detect the downlink transmission on the second set of resources within the time range, and the UE may determine that one or more next occurrences of the first set of resources are available for grant-free uplink transmissions after detecting the downlink transmission on the second set of resources within the time range.

In aspects, the configuration may indicate the time range as an offset relative to one of the configured grant resources. For example, the configuration may indicate the time range as an offset relative to the first set of resources. The time range may span one or more periods of the configured grant resources or a certain time duration, for example, in milliseconds or as a time-domain resource such as one or more symbols, mini-slots, slots, etc.

In certain aspects, a set of configured grant resources may be associated with downlink resources for a downlink SPS transmission. As an example, the set of configured grant resources may have the same size as the downlink resources, such as the same number of symbols. The set of configured grant resources may have the same periodicity as the downlink resources, but the set of configured grant resources may be offset relative to the downlink resources. For example, if the UE detects a downlink SPS transmission on the downlink resources, the UE may determine that the next occurrence of the set of configured grant resources is available for grant-free uplink transmissions.

In accordance with certain aspects, the valid time to transmit the grant-free uplink transmission may be determined based on whether an uplink transmission is scheduled, for example, as described herein with respect to FIG. 6. A set of configured grant resources may be associated with downlink or uplink resources corresponding to a dynamically scheduled uplink transmission, and the UE may determine whether the set of configured grant resources are available for grant-free uplink transmission if the UE detects an uplink grant on the downlink resources or a scheduled uplink transmission on the uplink resources. In other aspects, the UE may piggyback any packets generated for grant-free uplink transmission on the scheduled uplink transmission.

As an example, a first set of the sets of configured grant resources may be associated with a second set of resources corresponding to the uplink transmission. The UE may generate one or more packets for a grant-free uplink transmission on the first set of resources and receive, from the base station, a grant for an uplink transmission. The UE may determine that the first set of resources are temporarily unavailable for grant-free uplink transmissions based on detecting the uplink grant on the second set of resources. That is, the UE may temporarily refrain from communicating via the first set of resources upon detecting the uplink grant on the second set of resources. The UE may then transmit, to the base station, the one or more packets with the uplink transmission according to the grant.

In other cases, the UE may determine that the first set of resources are temporarily unavailable for grant-free uplink transmissions based on the uplink grant scheduling the uplink transmission on the second set of resources. That is, the UE may temporarily refrain from communicating via the first set of resources upon identifying that the uplink grant scheduled an uplink transmission on the second set of resources. The UE may then transmit, to the base station, the one or more packets with the uplink transmission according to the grant.

In certain aspects, the valid time to transmit the grant-free uplink transmission may be determined based on a prohibit timer associated with the grant of the uplink transmissions, for example, as described herein with respect to FIG. 4. As an example, the first set of resources may be associated with a prohibit timer that runs from the grant of the uplink transmission, and the UE may refrain from transmitting a grant-free uplink transmission via at least one of the one or more sets of resources during the prohibit timer. In some cases, the prohibit timer may run from the detection of the uplink grant on the second set of resources or from the scheduled uplink transmission on the second set of resources.

Figure 8:
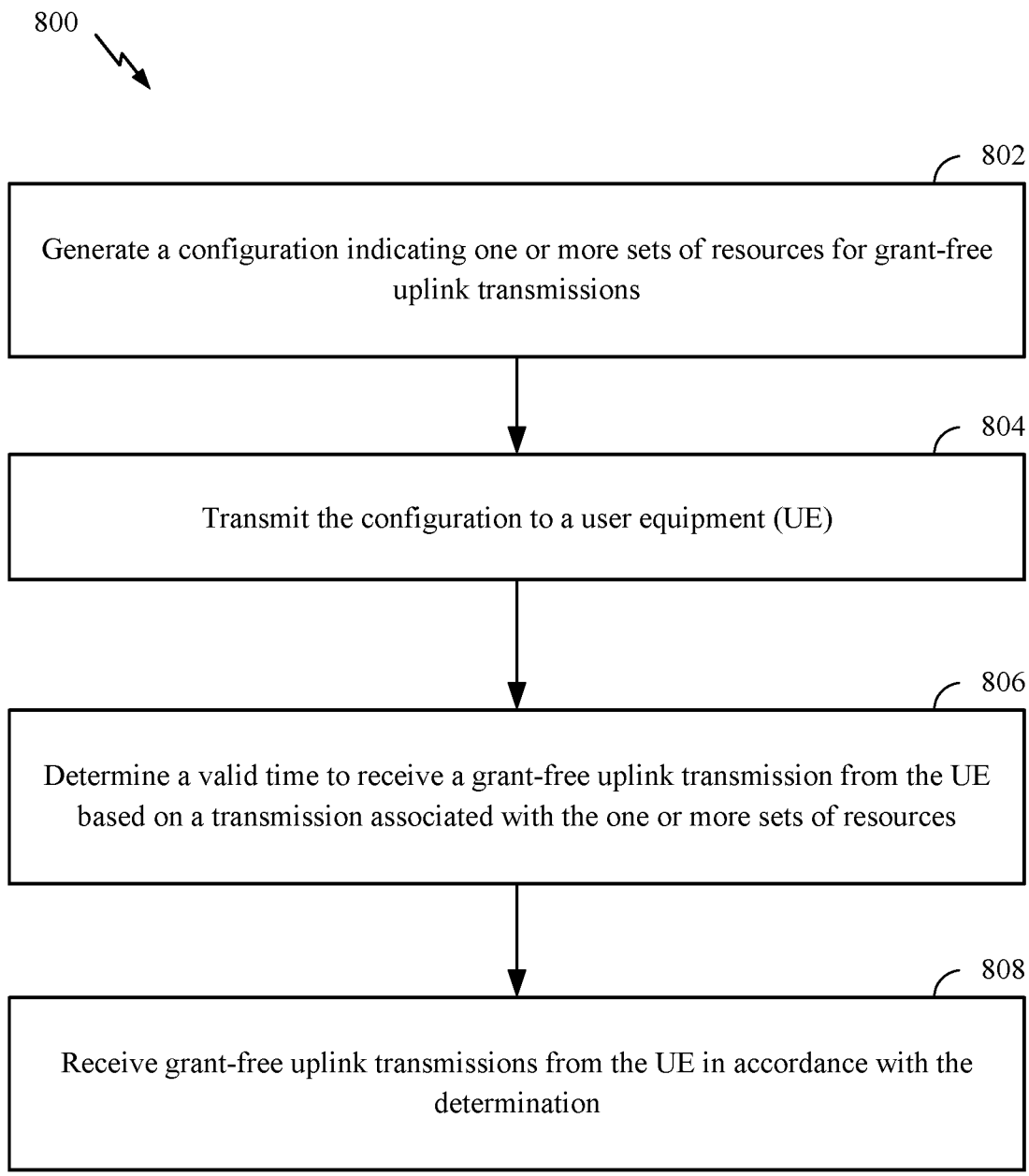
FIG. 8 is a flow diagram illustrating example operations for wireless communication by a base station (BS), in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., the BS 110a in the wireless communication network 100). The operations 800 may be complimentary to the operations 700 performed by the UE. Operations 800 may be implemented as software components that are executed and run on one or more processors (e.g., controller/processor 1040 of FIG. 10). Further, the transmission and reception of signals by the BS in operations 800 may be enabled, for example, by one or more antennas (e.g., antennas 1034 of FIG. 10). In certain aspects, the transmission and/or reception of signals by the BS may be implemented via a bus interface of one or more processors (e.g., controller/processor 1040) obtaining and/or outputting signals.

The operations 800 may begin, at 802, where the BS may generates a configuration indicating one or more sets of resources for grant-free uplink transmissions. At 804, the BS may transmit the configuration to a UE. At 806, the BS may determine a valid time to receive grant-free uplink transmissions from the UE based on a transmission associated with the one or more sets of resources. At 808, the BS may receive grant-free uplink transmissions from the UE in accordance with the determination.

In aspects, the configuration may indicate that a set of configured grant resources is associated with a prohibit timer that runs from a grant-free uplink transmission on the set of configured grant resources, for example, as described herein with respect to FIGS. 4 and 7. For instance, the configuration may indicate a first set of the sets of resources is associated with a prohibit timer that runs from a grant-free uplink transmission on the first set of resources. At 806, the BS may determine the valid time to receive the grant-free uplink transmission from the UE based on the prohibit timer.

In aspects, the configuration may indicate that a set of configured grant resources is associated with downlink resources, for example, as described herein with respect to FIGS. 5 and 7. For instance, the configuration may indicate that a first set of the sets of resources is associated with a second set of resources for downlink transmissions. At 806, the BS may determine the valid time to receive the grant-free uplink transmission on the first set of resources based on the downlink transmissions on the second set of resources. In certain aspects, the valid time to receive the grant-free uplink transmission on the first set of resources may be dependent on transmitting a downlink transmission on the second set of resources before communicating via the first set of resources.

In other aspects, the valid times to receive the grant-free uplink transmissions on the first set of resources may be dependent on detecting no downlink transmission on the second set of resources. For example, the configuration may indicate that a third set of the sets of resources is available for grant-free uplink transmissions if no downlink transmission is transmitted on the second set of resources. The BS may determine the valid time to receive the grant-free uplink transmission on the third set of resources based on no downlink transmission being transmitted on the second set of resources.

In aspects, the configuration may indicate that the configured grant resources is associated with a time range before an occurrence of the configured grant resources. For instance, the configuration may indicate that the first set of resources is associated with a time range before the first set of resources. The BS may determine the valid time to receive the grant-free uplink transmissions on the first set of resources if a downlink transmission on the second set of resources is transmitted within the time range. The configuration may further indicate the time range as an offset relative to the first set of resources. The downlink transmission may at least one of a data transmission, a unicast grant transmission, or a downlink SPS transmission.

A set of configured grant resources may be associated with downlink resources for a downlink SPS transmission. As an example, the set of configured grant resources may have the same size as the downlink resources, such as the same number of symbols. The set of configured grant resources may have the same periodicity as the downlink resources, but the set of configured grant resources may be offset relative to the downlink resources. For example, if the BS determines that a downlink SPS transmission is transmitted on the downlink resources, the BS may determine that the next occurrence of the set of configured grant resources is available for grant-free uplink transmissions and blind decode that configured grant resource.

In aspects, the configuration may indicate that a set of configured grant resources is associated with downlink or uplink resources corresponding to an uplink transmission, for example, as described herein with respect to FIGS. 6 and 7. For example, the configuration may indicate that a first set of the sets of resources is associated with a second set of resources corresponding to an uplink transmission. The BS may transmit, to the UE, a grant for an uplink transmission associated with the second set of resources, and the BS may determine the valid time to receive the grant-free uplink transmission on the first set of resources based on the uplink transmission being transmitted. In certain aspects, the grant for the uplink transmission may be transmitted on the second set of resources, and the grant may indicate that the first set of resources are temporarily unavailable for grant-free uplink transmissions. That is, the valid time to receive the grant-free uplink transmission on the first set of resources may be based on the uplink grant being transmitted on the second set of resources.

In other aspects, the grant may schedule the uplink transmission on the second set of resources, and the scheduled uplink transmission may indicate that the first set of resources are temporarily unavailable for grant-free uplink transmissions. That is, the valid time to receive the grant-free uplink transmissions on the first set of resources may be based on the uplink transmission being scheduled on the second set of resources.

In aspects, the configuration may indicate that a set of configured grant resources is associated with a prohibit timer that runs from the grant of the uplink transmission, for example, as described herein with respect to FIGS. 4 and 7. As an example, the configuration may indicate that the first set of resources is associated with a prohibit timer that runs from the grant of the uplink transmission, and the BS may refrain from decoding a grant-free uplink transmission via at least one of the one or more sets of resources during the prohibit timer. In some cases, the prohibit timer may run from the detection of the uplink grant on the second set of resources or from the scheduled uplink transmission on the second set of resources.

Figure 9:
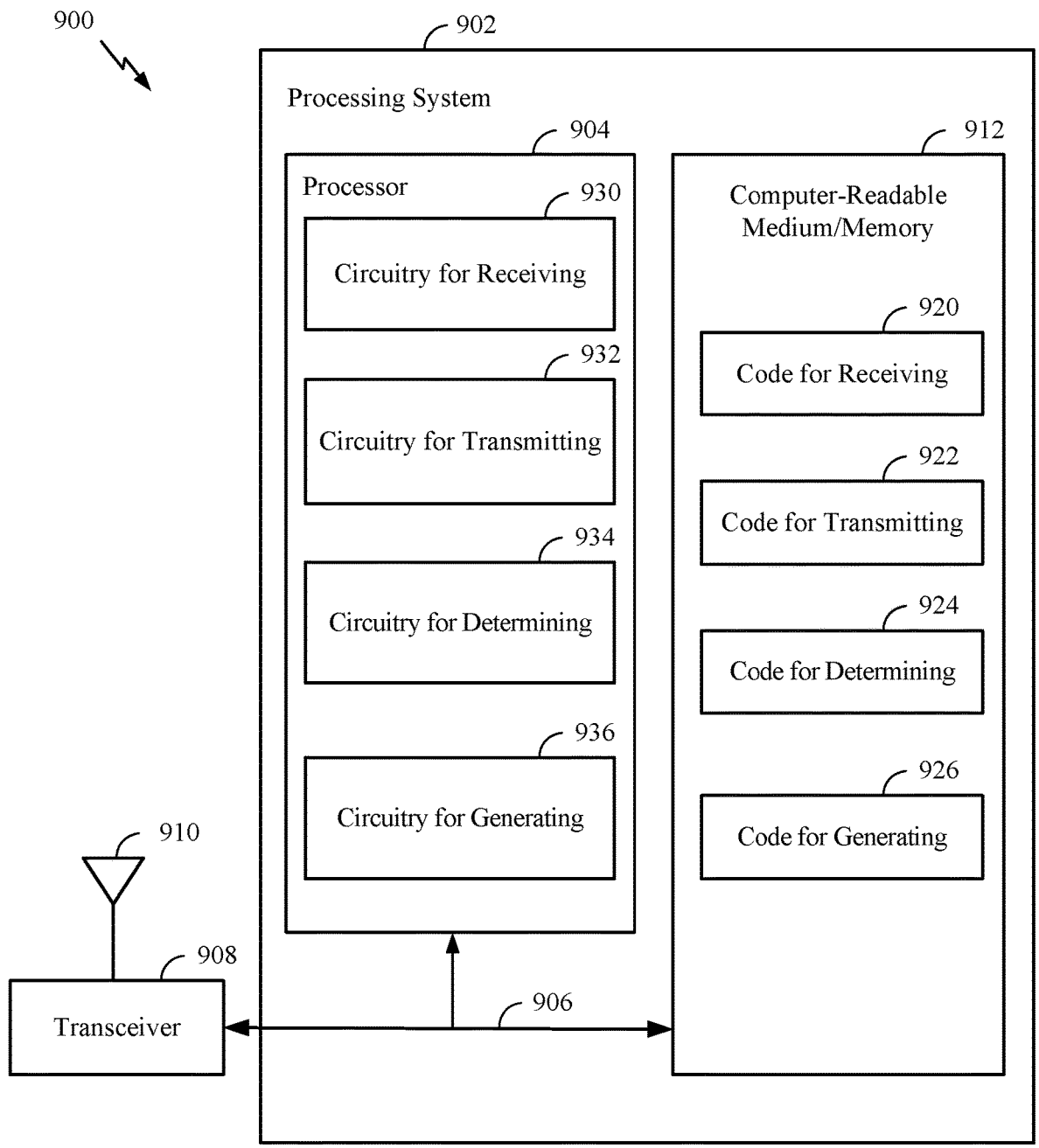
FIG. 9 illustrates a communications device that may include various components configured to perform operations for the techniques disclosed herein in accordance with aspects of the present disclosure.

FIG. 9 illustrates a communications device 900 (e.g., BS 110a and/or UE 120a of FIG. 1) that may include various components (e.g., corresponding to means-plus-function components) configured to perform operations for the techniques disclosed herein, such as the operations illustrated in FIGS. 7 and 8. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 7 and 8, or other operations for performing the various techniques discussed herein for configured uplink grant resource validation. In certain aspects, computer-readable medium/memory 912 may store code for receiving 920; code for transmitting 922; code for determining 924; and/or code for generating 926. In certain aspects, the processor 904 has circuitry configured to implement the code stored in the computer-readable medium/memory 912. The processor 904 may include circuitry for receiving 930; circuitry for transmitting 932; circuitry for determining 934; and/or circuitry for generating 936.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Figure 10:
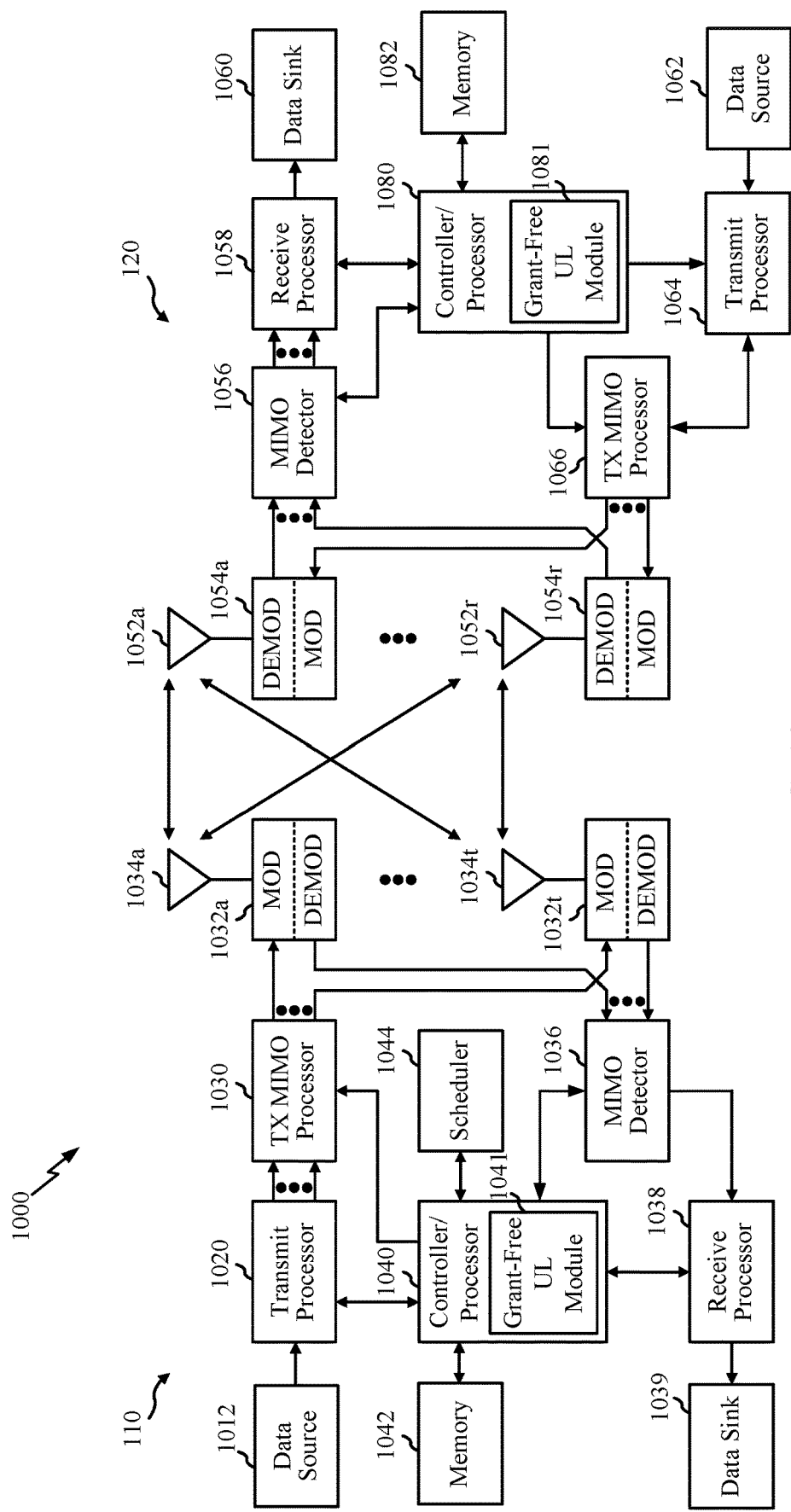
FIG. 10 is a block diagram conceptually illustrating a design of an example BS and UE, in accordance with certain aspects of the present disclosure.

FIG. 10 illustrates example components of BS 110 and UE 120 (e.g., BS 110a and UE 120a of FIG. 1), which may be used to implement aspects of the present disclosure.

At the BS 110, a transmit processor 1020 may receive data from a data source 1012 and control information from a controller/processor 1040. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 1020 may process (e.g., encode and symbol map) the data and control information to obtain data symbols and control symbols, respectively. The transmit processor 1020 may also generate reference symbols, such as for the primary synchronization signal (PSS), secondary synchronization signal (SSS), and cell-specific reference signal (CRS). A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) 1032a-1032t. Each modulator 1032 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1032a-1032t may be transmitted via the antennas 1034a-1034t, respectively.

At the UE 120, the antennas 1052a-1052r may receive the downlink signals from the BS 110 and may provide received signals to the demodulators (DEMODs) in transceivers 1054a-1054r, respectively. Each demodulator 1054 may condition (e.g., filter, amplify, downconvert, and digitize) a respective received signal to obtain input samples. Each demodulator may further process the input samples (e.g., for OFDM, etc.) to obtain received symbols. A MIMO detector 1056 may obtain received symbols from all the demodulators 1054a-1054r, perform MIMO detection on the received symbols if applicable, and provide detected symbols. A receive processor 1058 may process (e.g., demodulate, deinterleave, and decode) the detected symbols, provide decoded data for the UE 120 to a data sink 1060, and provide decoded control information to a controller/processor 1080.

On the uplink, at UE 120, a transmit processor 1064 may receive and process data (e.g., for the physical uplink shared channel (PUSCH)) from a data source 1062 and control information (e.g., for the physical uplink control channel (PUCCH)) from the controller/processor 1080. The transmit processor 1064 may also generate reference symbols for a reference signal (e.g., for the sounding reference signal (SRS)). The symbols from the transmit processor 1064 may be precoded by a TX MIMO processor 1066 if applicable, further processed by the demodulators in transceivers 1054a-1054r (e.g., for SC-FDM, etc.), and transmitted to the BS 110. At the BS 110, the uplink signals from the UE 120 may be received by the antennas 1034, processed by the modulators 1032, detected by a MIMO detector 1036 if applicable, and further processed by a receive processor 1038 to obtain decoded data and control information sent by the UE 120. The receive processor 1038 may provide the decoded data to a data sink 1039 and the decoded control information to the controller/processor 1040.

The memories 1042 and 1082 may store data and program codes for BS 110 and UE 120, respectively. A scheduler 1044 may schedule UEs for data transmission on the downlink and/or uplink.

The controller/processor 1080 and/or other processors and modules at the UE 120 may perform or direct the execution of processes for the techniques described herein. For example, as shown in FIG. 10, the controller/processor 1040 of the BS 110 has a grant-free uplink module 1041 that may be configured for determining valid times to receive grant-free uplink transmissions, according to aspects described herein. As shown in FIG. 10, the controller/processor 1080 of the UE 120 has a grant-free uplink module 1081 that may be configured for determining valid times to transmit grant-free uplink transmissions, according to aspects described herein. Although shown at the Controller/Processor, other components of the UE 120 and BS 110 may be used performing the operations described herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
   receiving, from a base station, a configuration indicating one or more sets of resources for grant-free uplink transmissions;
   determining a valid time to transmit a grant-free uplink transmission via the one or more sets of resources based on a transmission associated with the one or more sets of resources, wherein determining the valid time to transmit the grant-free uplink transmission comprises determining, based on the configuration, that a first set of resources of the one or more sets of resources is associated with a prohibit timer;
   transmitting, to the base station, the grant-free uplink transmission via the first set of resources based on the determination; and
   refraining from transmitting a subsequent grant-free uplink transmission via at least one of the one or more sets of resources during the prohibit timer in accordance with the determination.

2. The method of claim 1, wherein the prohibit timer applies to refraining from transmitting the subsequent grant-free uplink transmission on all of the one or more sets of resources or only applies to refraining from transmitting the subsequent grant-free uplink transmission on the first set of resources.

3. The method of claim 1, wherein:
   the prohibit timer is a timer that runs from the grant-free uplink transmission on the first set of resources; and
   the configuration indicates the prohibit timer as a number of periods associated with the at least one of the one or more sets of resources or as a time range.

4. The method of claim 1, wherein:
   determining the valid time to transmit the grant-free uplink transmission comprises determining, based on the configuration, that the first set of resources is associated with a second set of resources for downlink transmissions; and
   transmitting comprises transmitting, to the base station, the grant-free uplink transmission via the first set of resources based on whether the UE detects a downlink transmission on the second set of resources.

5. The method of claim 4, further comprising:
   determining that transmitting via the first set of resources is dependent on detecting the downlink transmission on the second set of resources before communicating via the first set of resources;

detecting the downlink transmission on the second set of resources; and wherein transmitting comprises transmitting the grant-free uplink transmission via the first set of resources after detecting the downlink transmission on the second set of resources.

6. A method of wireless communication by a user equipment (UE), comprising:
receiving, from a base station, a configuration indicating sets of resources for grant-free uplink transmissions;
determining a valid time to transmit a grant-free uplink transmission via the one or more sets of resources based on a transmission associated with the one or more sets of resources, wherein determining the valid time to transmit the grant-free uplink transmission comprises determining, based on the configuration, that a first set of resources of the sets of resources is associated with a second set of resources for downlink transmissions;
determining, based on the configuration, that a third set of resources of the sets of resources is available for grant-free uplink transmissions if no downlink transmission is detected on the second set of resources;
determining that no downlink transmission is detected on the second set of resources; and
transmitting, to the base station, the grant-free uplink transmission based on the determination of the valid time, wherein transmitting comprises:
transmitting, to the base station, the grant-free uplink transmission via the first set of resources based on whether the UE detects a downlink transmission on the second set of resources; and
transmitting the grant-free uplink transmission via the third set of resources after detecting no downlink transmission on the second set of resources.

7. A method of wireless communication by a user equipment (UE), comprising:
receiving, from a base station, a configuration indicating one or more sets of resources for grant-free uplink transmissions;
determining a valid time to transmit a grant-free uplink transmission via the one or more sets of resources based on a transmission associated with the one or more sets of resources, wherein determining the valid time to transmit the grant-free uplink transmission comprises determining, based on the configuration, that a first set of resources of the one or more sets of resources is associated with a second set of resources for downlink transmission;
determining that the first set of resources is associated with a time range before the first set of resources and that transmitting via the first set of resources is dependent on detecting the downlink transmission on the second set of resources within the time range;
detecting the downlink transmission on the second set of resources within the time range; and
transmitting, to the base station, the grant-free uplink transmission based on the determination of the valid time, wherein transmitting comprises:
transmitting, to the base station, the grant-free uplink transmission via the first set of resources based on whether the UE detects a downlink transmission on the second set of resources; and
transmitting the grant-free uplink transmission via the first set of resources after detecting the downlink transmission on the second set of resources within the time range.

8. The method of claim 7, wherein:
the configuration further indicates the time range as an offset relative to the first set of resources; and
the downlink transmission includes at least one of a data transmission, a unicast grant transmission, or a downlink semi-persistent scheduling (SPS) transmission.

9. The method of claim 7, wherein:
the downlink transmission is a downlink SPS transmission;
the first set of resources has a same size as the second set of resources;
the first set of resources has a same periodicity as the second set of resources; and
the first set of resources is offset relative to the second set of resources.

10. A method of wireless communication by a user equipment (UE), comprising:
receiving, from a base station, a configuration indicating one or more sets of resources for grant-free uplink transmissions;
generating one or more packets for a grant-free uplink transmission on a first set of resources of the one or more sets of resources;
receiving, from the base station, a grant for an uplink transmission;
determining a valid time to transmit the grant-free uplink transmission via the one or more sets of resources based on a transmission associated with the one or more sets of resources, wherein determining the valid time to transmit the grant-free uplink transmission comprises determining, based on the configuration, that the first set of resources is associated with a second set of resources corresponding to the uplink transmission;
determining, based on the configuration, that the first set of resources is associated with a prohibit timer that runs from the grant of the uplink transmission;
transmitting, to the base station, the grant-free uplink transmission based on the determination;
transmitting, to the base station, the one or more packets with the uplink transmission according to the grant; and
refraining from transmitting the grant-free uplink transmission via at least one of the one or more sets of resources during the prohibit timer.

11. The method of claim 10, further comprising:
detecting the grant on the second set of resources; and
wherein transmitting the one or more packets comprises transmitting the one or more packets based on detecting the grant on the second set of resources.

12. The method of claim 10, further comprising:
determining that the grant schedules the uplink transmission on the second set of resources; and
wherein transmitting the grant-free uplink transmission comprises transmitting the one or more packets on the second set of resources based on the uplink transmission being scheduled on the second set of resources.

13. A method of wireless communication by a network entity, comprising:
generating a configuration indicating one or more sets of resources for grant-free uplink transmissions, wherein the configuration indicates that a first set of resources of the one or more sets of resources is associated with a prohibit timer that runs from a grant-free uplink transmission on the first set of resources;
transmitting the configuration to a user equipment (UE);
determining a valid time to receive a grant-free uplink transmission from the UE based on a transmission associated with the one or more sets of resources, wherein determining the valid time comprises determining the valid time to receive the grant-free uplink transmission from the UE based on the prohibit timer; and receiving grant-free uplink transmissions from the UE in accordance with the determination.

14. The method of claim 13, wherein the prohibit timer only applies to the first set of resources or only applies to all of the one or more sets of resources.

15. The method of claim 13, wherein the configuration indicates the prohibit timer as a number of periods associated with at least one of the one or more sets of resources or as a time range.

16. The method of claim 13, wherein:
the configuration indicates that the first set of resources is associated with a second set of resources for downlink transmissions; and
determining the valid time comprises determining the valid time to receive the grant-free uplink transmission on the first set of resources based on the downlink transmissions on the second set of resources.

17. The method of claim 16, wherein the valid time to receive the grant-free uplink transmission on the first set of resources is dependent on transmitting a downlink transmission on the second set of resources before communicating via the first set of resources.

18. A method of wireless communication by a network entity, comprising:
generating a configuration indicating sets of resources for grant-free uplink transmissions, wherein the configuration indicates that a first set of resources of the sets of resources is associated with a second set of resources for downlink transmissions, and the configuration further indicates that a third set of resources of the sets of resources is available for grant-free uplink transmissions if no downlink transmission is transmitted on the second set of resources;
transmitting the configuration to a user equipment (UE);
determining a valid time to receive a grant-free uplink transmission from the UE based on a transmission associated with the sets of resources, wherein determining the valid time comprises:
determining the valid time to receive the grant-free uplink transmission on the first set of resources based on the downlink transmissions on the second set of resources, and
determining the valid time to receive the grant-free uplink transmissions on the third set of resources based on no downlink transmission being transmitted on the second set of resources; and
receiving grant-free uplink transmissions from the UE in accordance with the determination of the valid time.

19. A method of wireless communication by a network entity, comprising:
generating a configuration indicating one or more sets of resources for grant-free uplink transmissions, wherein the configuration indicates that a first set of resources of the one or more sets of resources is associated with a second set of resources for downlink transmissions, and the configuration further indicates that the first set of the sets of resources is associated with a time range before the first set of resources;
transmitting the configuration to a user equipment (UE);
determining a valid time to receive a grant-free uplink transmission from the UE based on a transmission associated with the one or more sets of resources, wherein determining the valid time comprises:

determining the valid time to receive the grant-free uplink transmission on the first set of resources based on the downlink transmissions on the second set of resources, and
determining the valid time to receive the grant-free uplink transmission on the first set of resources if a downlink transmission on the second set of resources is transmitted within the time range; and
receiving grant-free uplink transmissions from the UE in accordance with the determination.

20. The method of claim 19, wherein:
the configuration further indicates the time range as an offset relative to the first set of resources; and
the downlink transmission includes at least one of a data transmission, a unicast grant transmission, or a downlink semi-persistent scheduling (SPS) transmission.

21. The method of claim 19, wherein:
the downlink transmission is a downlink SPS transmission;
the first set of resources has a same size as the second set of resources;
the first set of resources has a same periodicity as the second set of resources; and
the first set of resources are offset relative to the second set of resources.

22. A method of wireless communication by a network entity, comprising:
generating a configuration indicating one or more sets of resources for grant-free uplink transmissions, wherein the configuration further indicates that a first set of resources of the one or more sets of resources is associated with a prohibit timer that runs from a grant of an uplink transmission;
transmitting the configuration to a user equipment (UE);
transmitting, to the UE, a grant for an uplink transmission;
receiving, from the UE, the uplink transmission according to the grant, wherein the configuration further indicates that the first set of resources is associated with a second set of resources corresponding to the uplink transmission; and
determining a valid time to receive a grant-free uplink transmission from the UE based on a transmission associated with the one or more sets of resources, wherein determining the valid time comprises:
determining the valid time to receive the grant-free uplink transmissions on the first set of resources based on the uplink transmission being transmitted, and
determining the valid time to receive the grant-free uplink transmission on the first set of resources based on the prohibit timer; and
receiving grant-free uplink transmissions from the UE in accordance with the determination.

23. The method of claim 22, wherein:
transmitting the grant for an uplink transmission comprises transmitting the grant for the uplink transmission on the second set of resources; and
determining the valid time comprises determining the valid time to receive the grant-free uplink transmissions on the first set of resources based on the grant being transmitted on the second set of resources.

24. The method of claim 22, wherein:
the grant schedules the uplink transmission on the second set of resources; and
determining the valid time comprises determining the valid time to receive the grant-free uplink transmission on the first set of resources based on the uplink transmission being scheduled on the second set of resources.

25. An apparatus for wireless communication, comprising:
- a receiver configured to receive, from a base station, a configuration indicating one or more sets of resources for grant-free uplink transmissions;
- a processor configured to determine a valid time to transmit a grant-free uplink transmission via the one or more sets of resources based on a transmission associated with the one or more sets of resources, wherein to determine the valid time to transmit the grant-free uplink transmission, the processor is further configured to determine, based on the configuration, that a first set resources of the one or more sets of resources is associated with a prohibit timer;
- a memory coupled to the processor;
- a transmitter configured to transmit, to the base station, the grant-free uplink transmission via the first set of resources based on the determination; and
- wherein the transmitter is further configured to refrain from transmitting a subsequent grant-free uplink transmission via at least one of the one or more sets of resources during the prohibit timer in accordance with the determination.

26. An apparatus for wireless communication, comprising:
- a processor configured to:
  - generate a configuration indicating one or more sets of resources for grant-free uplink transmissions, wherein the configuration indicates that a first set of the one or more sets of resources is associated with a prohibit timer that runs from a grant-free uplink transmission on the first set of resources, and
  - determine a valid time to receive a grant-free uplink transmission from a user equipment (UE) based on a transmission associated with the one or more sets of resources, wherein to determine the valid time, the processor is further configured to determine the valid time to receive the grant-free uplink transmission from the UE based on the prohibit timer;
- a memory coupled to the processor;
- a transmitter configured to transmit the configuration to the UE; and
- a receiver configured to receive grant-free uplink transmissions from the UE in accordance with the determination.

* * * * *